June 24, 1958     H. B. TURNER     2,840,040
VARIABLE POULTRY FEEDER
Filed Aug. 6, 1956     2 Sheets-Sheet 1

*INVENTOR.*
H. B. TURNER
BY
*Albert J. Kramer*
ATTORNEY

June 24, 1958  H. B. TURNER  2,840,040
VARIABLE POULTRY FEEDER
Filed Aug. 6, 1956  2 Sheets-Sheet 2
FIG. 6.
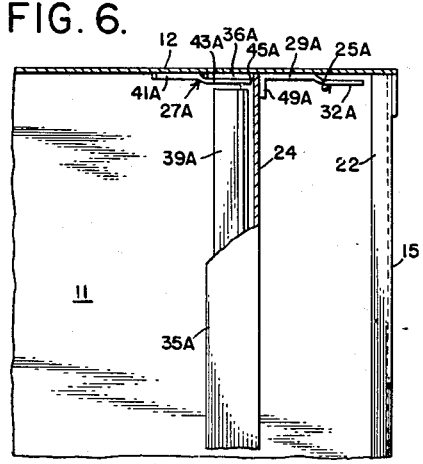
FIG. 5.
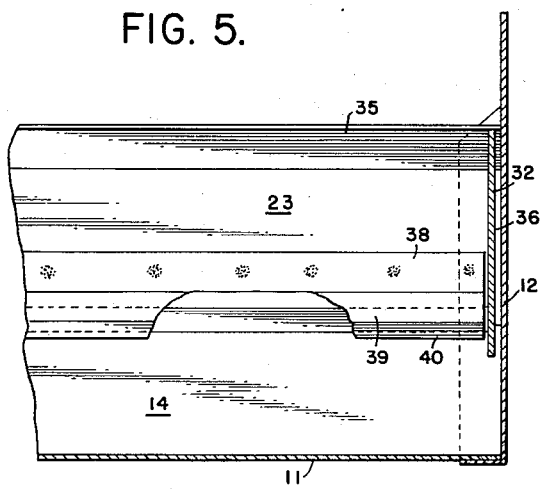
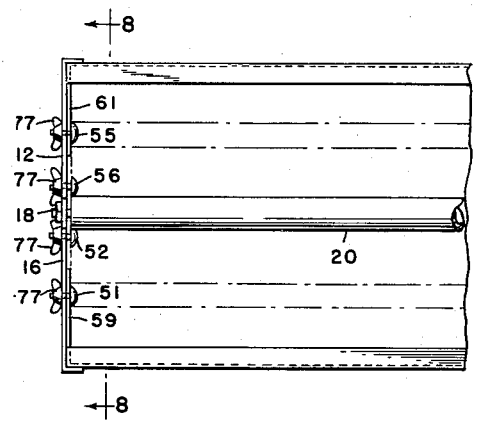
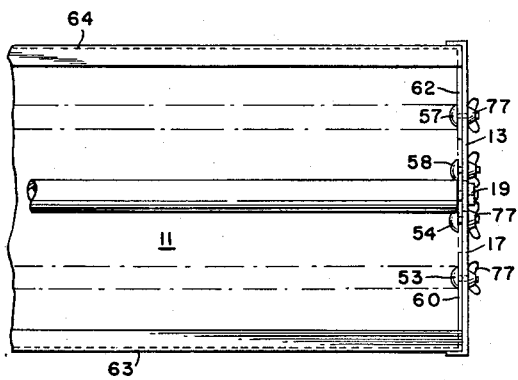
FIG. 7.
FIG. 8.
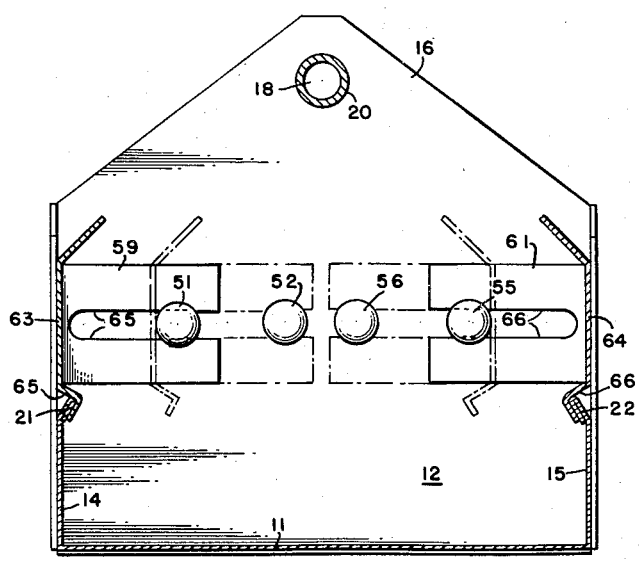
INVENTOR.
H. B. TURNER
BY
Albert J. Kramer
ATTORNEY

United States Patent Office 2,840,040
Patented June 24, 1958

2,840,040

VARIABLE POULTRY FEEDER

Herman B. Turner, Timberville, Va.

Application August 6, 1956, Serial No. 602,379

5 Claims. (Cl. 119—61)

This invention relates to poultry feeders and it is more particularly concerned with the variable or adjustable type of poultry feeders that can be altered to accommodate baby chicks or full grown chickens.

One of the objects of the invention is the provision of an adjustable or variable poultry feeder of the type mentioned which is sturdy, simple in construction and easy to manufacture with a minimum of moving parts.

Another object is the provision of novel means for changing or altering the device from one which will accommodate baby chicks to one which will accommodate full grown chickens and vice versa.

A further object of the invention is the provision of such means which is effective and easy to use and which requires no intricate or complicated operations.

These and other objects, advantages and benefits of the invention will be apparent from the following description considered together with the accompanying drawing.

In the drawing:

Fig. 5 is a sectional view along the line 5—5 of Fig. 4.

Fig. 6 is a sectional view along the line 6—6 of Fig. 4.

Fig. 7 is a top plan view of a modified form of the invention, partly broken away.

Fig. 8 is a cross-sectional view on an enlarged scale along the line 8—8 of Fig. 7.

Figure 1:
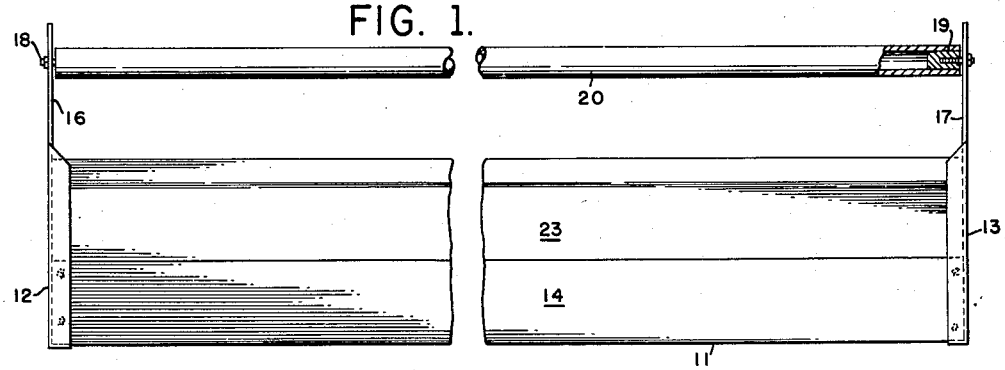
Fig. 1 is a side elevational view of an embodiment of the invention, partly broken away, in position for feeding grown chickens.
Figure 2:
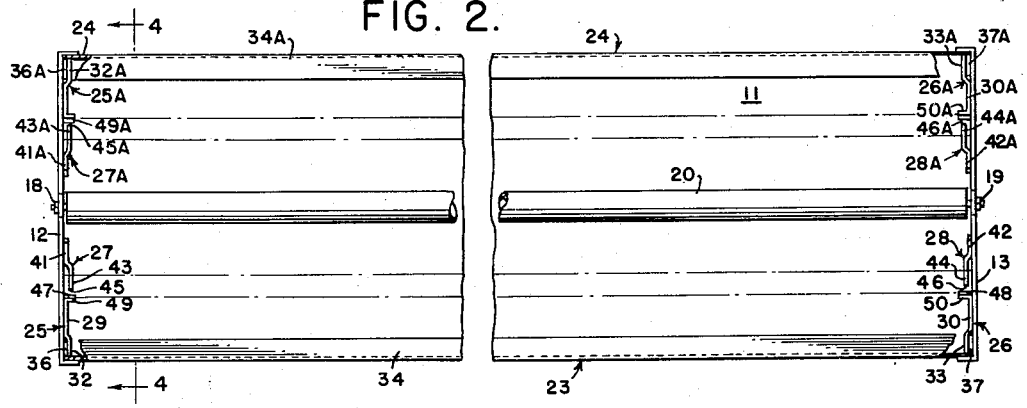
Fig. 2 is a top plan view of the same embodiment, also partly broken away, in the same position.

Referring with more particularity to the drawing in which like numerals designate like parts, the embodiment of Figs. 1 to 6 comprises a poultry trough having a bottom wall 11, end walls 12 and 13, and stationary lower side wall panels 14 and 15.

The upper portions 16 and 17 of the end walls are tapered and rotatably carry on bearings 18 and 19, the ends of a circular bar 20 which discourages fowl from getting inside the device. It may also, incidentally, be used as a handle to carry the device from one place to another.

The stationary side wall panels 14 and 15 extend upwardly only a short distance to permit baby chicks to feed from either side. The upper lips 21 and 22 of these panels are bent to project upwardly and inwardly, the purpose of which will be explained more fully hereinafter.

Figure 4:
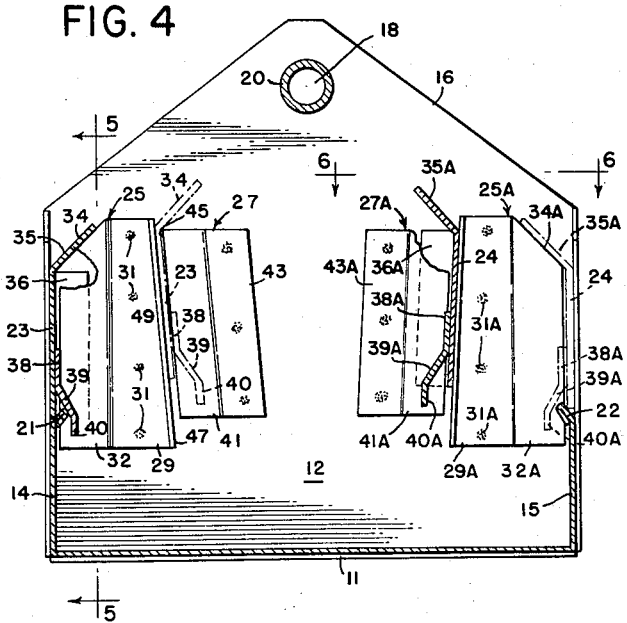
Fig. 4 is a cross-sectional view on an enlarged scale along the line 4—4 of Fig. 2, with the two movable end wall panels in different positions, the alternate positions being shown in dotted lines.
Figure 3:
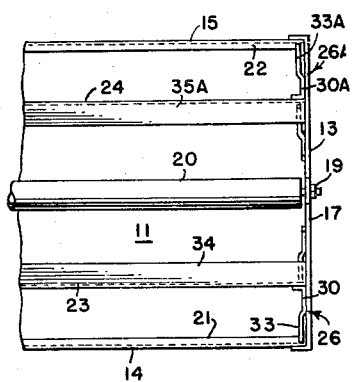
Fig. 3 is a fragmentary plan view of a portion of the same embodiment in position for feeding baby chicks.

Each stationary side wall panel 14 and 15 is provided with a movable upper panel 23 and 24, respectively, which can be placed in one of two positions, depending upon whether the device is to be used for feeding baby chicks or grown chickens. In Fig. 4, the panel 24 is in position for feeding baby chicks and the panel 23 is in position for feeding grown chickens, the alternate positions of these panels being shown in dotted lines. Brackets on the end walls 12 and 13 define the positions of these movable panels and hold them in place, each panel being provided with an outer pair of brackets and an inner pair of brackets.

The panel 23, for example, is provided with an outer pair of brackets 25, 26 and an inner pair 27, 28. The outer brackets 25, 26 each comprise a plate having an inner portion 29 and 30 welded or soldered to the end walls 12 and 13, respectively, as represented by the spot welds 31 of plate 29. Outer portions 32 and 33 of the brackets are offset inwardly and parallel to their corresponding end walls 12 and 13, respectively. The upper ends of the portions 32 and 33 are mitered to provide beveled shoulders 34 to fit inwardly bent top margin 35 of the panel 23.

The panel 23 is also provided with inwardly bent or flanged end portions 36 and 37, which fit in the space between the offset portions 32, 33 and the corresponding end walls 12 and 13. In this position, the bottom edge of the panel 23 rests on the lip 21 in line with the stationary panel 14. To hold the bottom edge in this position, a longitudinal retainer lip 38 is secured to the back of the panel 23 and it is provided with an inwardly offset portion 39 with a dependent skirt 40 that abuts the inner side of the lip 21, substantially as shown.

Thus the panel 23 is removably supported in its outermost position for feeding grown chickens. The panel 24 is supported in the same manner by similar brackets 25A, 26A with parts designated by corresponding numbers and the suffix "A."

The inner pair of brackets 27, 28 support the panel 23 in its inner position and they comprise also inner portions 41 and 42 welded or soldered to the end walls 12 and 13, respectively, and inwardly offset portions 43 and 44 parallel to the end walls, to accommodate the flanged ends 36 and 37. The outer edges 45 and 46 of the portions 43 and 44 are spaced from and parallel to the inner edges 47 and 48 of the brackets 25 and 26, the spacing being just sufficient to slidably accommodate the thickness of the panel 23. This permits a sliding engagement with the ends of the panel 23 and a holding of it in place between the adjacent edges of the two sets of brackets. To further stabilize the panel in this position, the edges 47 and 48 are provided with flanges 49 and 50, as shown. The lowermost position of the panel 23 is determined by contact of the marginal piece 35 with the top of the portion 29, as shown.

The panel 24 is held in the same way by similar inner brackets 27A and 28A with parts designated by corresponding numbers containing the suffixe "A."

To change the panels from one position to the other, it is only necessary to lift them up and out of engagement from one of the positions and slip them into the other position.

The modified form of the invention shown in Figs. 7 and 8 is essentially similar to the one shown in Figs. 1 to 6, except that the brackets on the end walls are not provided. Instead, there are provided pairs of clamping bolts 51, 52; 53, 54; 55, 56; and 57, 58, which slidably engage horizontal slots in the end flanges 59, 60, 61 and 62 of the movable side wall panels 63 and 64, such as the slots 65 and 66 in the flanges 59 and 61.

When the panels 63 and 64 are in their outermost positions, as shown by the full lines in Fig. 8, they are engaged with the outermost bolts 51, 53 and 55, 57, forming the inner support for the panels. The outer support is provided by channels 65 and 66 formed in the lower marginal edges of the panels 63 and 64, respectively, which abuttingly engage the upper lip portions 21 and 22 of the stationary panels 14 and 15, respectively.

When the panels 63 and 64 are in their innermost positions as shown by the dotted lines in Fig. 8, their flanged slots each engage a pair of clamping bolts which furnish the necessary support, such as bolts 51 and 52 for slot 65 and bolts 55 and 56 for slot 66.

The clamping bolts are provided with wing nuts 77 to effect the necessary clamping action when the panels have been placed in the proper positions.

From the above it will be apparent that this invention provides a simple and practical form of poultry feeding device that is inexpensive to manufacture, easy to use, and which meets the objectives set forth above.

Having thus described my invention, I claim:

1. A poultry feeding device comprising a receptacle having a bottom wall, end walls and side walls, said side walls comprising each a stationary lower panel and an upper movable panel, said upper panel being movable between a first position directly above and in alignment with the stationary panel and a second position substantially parallel to and inwardly offset from the first position, each stationary lower panel having an upper lip portion, each upper panel having an inwardly offset channel portion at its bottom adapted to removably contact and contain the lip portion of its corresponding lower panel in the said first position, and means at the end walls for supporting the upper movable panel in the said second position.

2. A device as defined by claim 1 in which the lip portions of the lower panels are bent inwardly and upwardly.

3. A device as defined by claim 1 in which the means at the end walls for supporting the upper panels in the second position comprises a double pair of brackets for each panel secured to the end walls, said upper panels having flanged ends, said brackets having portions inwardly offset from the end walls to provide spaces to receive said flanged ends, said upper panels and brackets having respective portions in vertical alignment to abut each other and support the upper panel when the said flanged ends are disposed in said spaces.

4. A poultry feeding device comprising a receptacle having a bottom wall, end walls and side walls, said side walls comprising each a stationary lower panel and an upper panel, said upper panel being movable between a first position directly above the stationary panel and a second position inwardly offset from and substantially parallel to the first position, each stationary lower panel having an upper lip portion, each upper panel having an inwardly offset channel portion at its bottom adapted to removably contact and contain the lip portion of its corresponding lower panel in the said first position, clamping bolts carried on the end walls, said upper panels having flanged ends slidably engaging said bolts.

5. A device as defined by claim 4 in which the flanged ends are provided with horizontal slots which slidably engage the clamping bolts.

References Cited in the file of this patent

UNITED STATES PATENTS

| | | |
|---|---|---|
| 2,321,877 | Troyer | June 15, 1943 |
| 2,518,085 | Smith | Aug. 8, 1950 |
| 2,539,299 | Duhmert | Jan. 23, 1951 |
| 2,671,429 | Hart | Mar. 9, 1954 |